United States Patent
Jacob et al.

(10) Patent No.: US 9,719,820 B1
(45) Date of Patent: Aug. 1, 2017

(54) HYBRID MATERIAL PITOT TUBE

(71) Applicants: ROSEMOUNT AEROSPACE INC., Burnsville, MN (US); Goodrich Aerospace Services Private Limited, KR Puram Hobli Bangalore, Karnataka (IN)

(72) Inventors: Robin Jacob, Karnataka (IN); Guru Prasad Mahapatra, Karnataka (IN); Paul Robert Johnson, Prior Lake, MN (US)

(73) Assignees: GOODRICH AEROSPACE SERVICES PRIVATE LIMITED, Karnataka (IN); ROSEMOUNT AEROSPACE INC., Burnsville, MN (US)

( * ) Notice: Subject to any disclaimer, the term of this patent is extended or adjusted under 35 U.S.C. 154(b) by 0 days.

(21) Appl. No.: 15/090,804

(22) Filed: Apr. 5, 2016

(30) Foreign Application Priority Data

Jan. 29, 2016 (IN) .............................. 201641003314

(51) Int. Cl.
*G01F 1/46* (2006.01)
*G01F 15/14* (2006.01)

(52) U.S. Cl.
CPC .............. *G01F 1/46* (2013.01); *G01F 15/14* (2013.01)

(58) Field of Classification Search
CPC .............. G01F 1/46; F04D 1/12; F16L 17/00
USPC .......................... 73/861.65; 415/88; 277/314
See application file for complete search history.

(56) References Cited

U.S. PATENT DOCUMENTS

| | | | |
|---|---|---|---|
| 2,510,986 A | 6/1950 | Larkin | |
| 2,984,107 A | 5/1961 | Strieby et al. | |
| 4,717,159 A * | 1/1988 | Alston | G01F 15/185 277/314 |
| 5,997,243 A * | 12/1999 | Shaw | F04D 1/12 415/88 |
| 6,134,972 A | 10/2000 | Streckert | |
| 6,892,584 B2 | 5/2005 | Gilkison | |
| 6,901,793 B1 | 6/2005 | Jefferson | |
| 7,186,951 B2 | 3/2007 | Zippold | |
| 2014/0116154 A1 | 5/2014 | Seidel | |

FOREIGN PATENT DOCUMENTS

WO 2014061158 A1 4/2014

OTHER PUBLICATIONS

Chung, D.D.L.; Coronas Alberto et al, "Materials for Thermal Conduction", Applied Thermal Engineering, Pergamon, Oxford, GB, vol. 21, No. 16, Nov. 1, 2001, pp. 1593-1605.
Extended European Search Report for International Application No. 17153700.4 dated Mar. 10, 2017, 12 pages.

* cited by examiner

*Primary Examiner* — Jewel V Thompson
(74) *Attorney, Agent, or Firm* — Cantor Colburn LLP

(57) ABSTRACT

A pitot tube includes a substantially cylindrical body portion having an interior defining a flow passage and a tip portion extending along a pitot tube axis from the body portion. The tip portion includes a disk, a tip cover and a high thermal conductive insert disposed between the disk and the tip cover and in thermal contact with both.

10 Claims, 3 Drawing Sheets

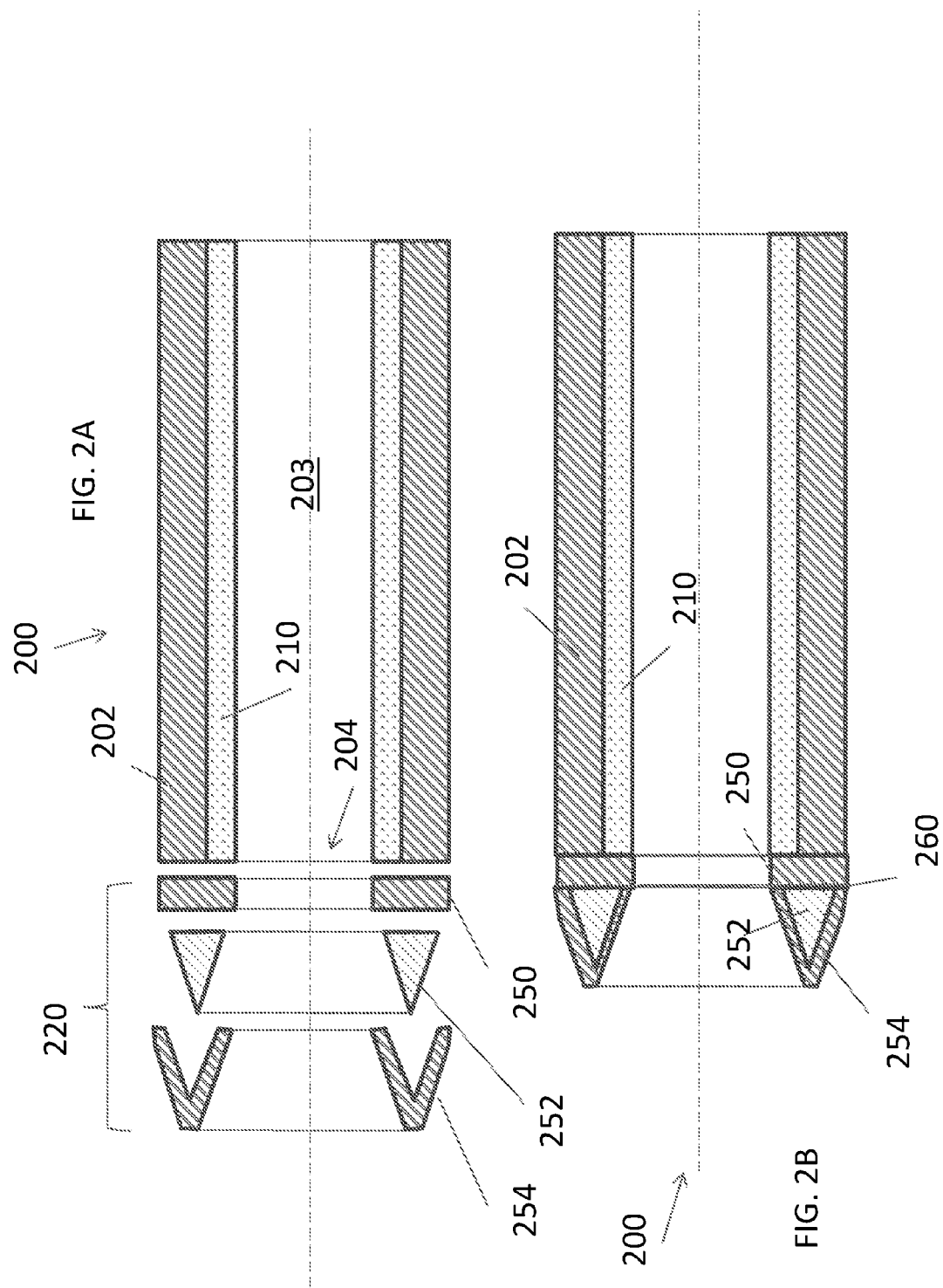

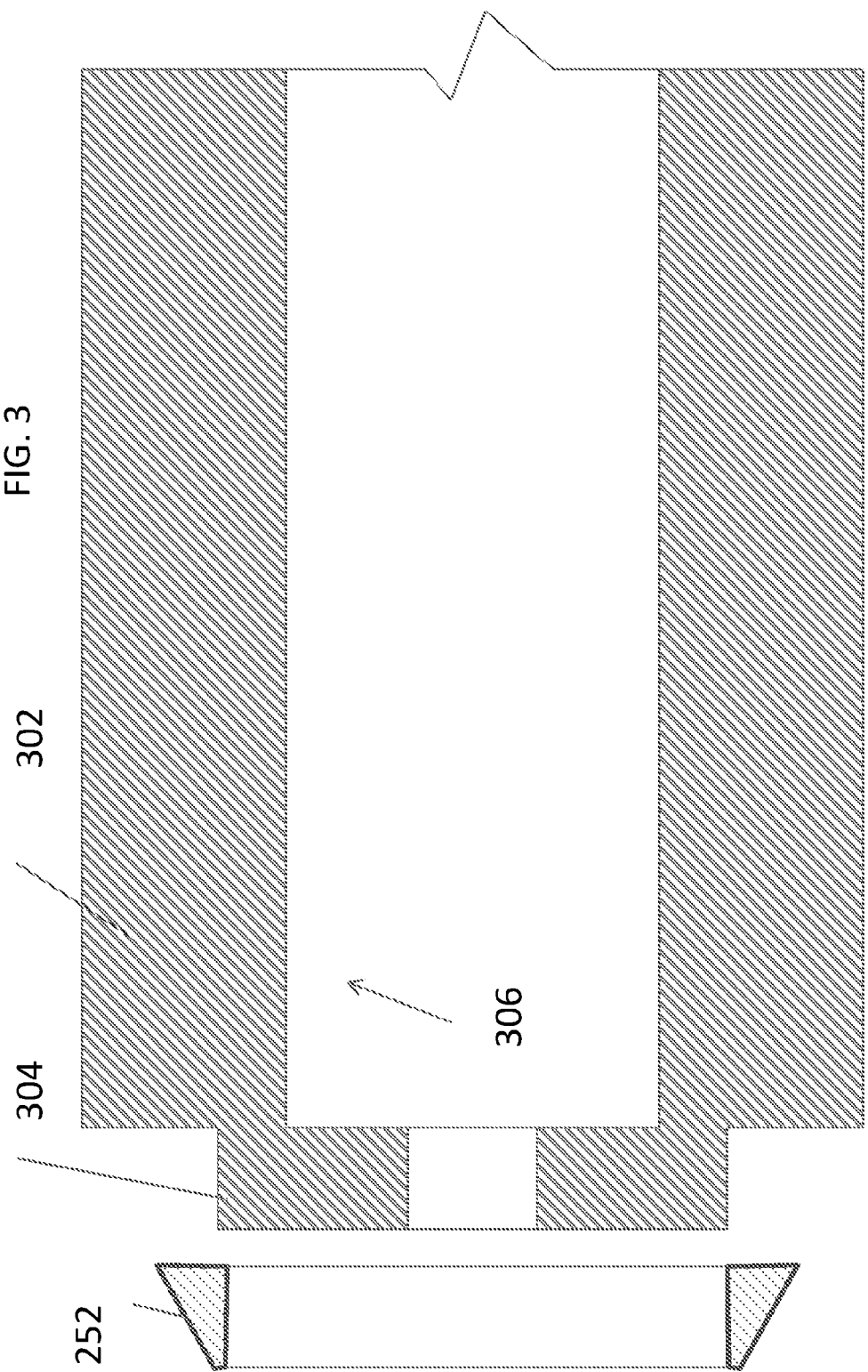

HYBRID MATERIAL PITOT TUBE

FOREIGN PRIORITY

This application claims priority to Indian Patent Application No. 201641003314 filed Jan. 29, 2016, the entire contents of which is incorporated herein by reference.

BACKGROUND

The subject matter disclosed herein generally relates to pitot tubes. More specifically, the present disclosure relates to ice prevention and removal from pitot tubes.

A pitot tube is widely used to determine airspeed of an aircraft or other vehicle, or to measure air or gas velocities in industrial applications. In particular, by measuring stagnation pressure of a fluid driven into the pitot tube, together with a measured static pressure, the airspeed of the aircraft can be determined. In certain flight conditions, the pitot tube may be subject to ice accumulation from moisture in the air. For this reason, pitot tubes are equipped with heating elements to prevent such ice accumulation. Further, in other conditions, the pitot tube may ingest ice crystals which then accumulate inside of the pitot tube and cause failure in its operation. A typical pitot tube is substantially cylindrical with an internal diameter containing the heating elements, or coils. Forward of the heating elements is a tip portion that extends radially from forward tip portion to an outer diameter of the pitot tube. An exterior of the typical tube is cylindrical along its length to the inlet. Such a tube has a large surface area of material in the tip portion forward of the heater, and is difficult to heat effectively and therefore to prevent ice accumulation thereon. Further, a large inlet diameter allows for proportionally more ice crystals to be ingested by the pitot tube. Such ingested ice crystals must be melted by the heating elements and drained from the pitot tube.

BRIEF DESCRIPTION

According to one aspect of an exemplary embodiment, a pitot tube that includes a substantially cylindrical body portion having an interior defining a flow passage and a tip portion extending along a pitot tube axis from the body portion is disclosed. The tip portion includes a disk, a tip cover and a high thermal conductive insert disposed between the disk and the tip cover and in thermal contact with both.

According to another aspect of an exemplary embodiment, a pitot tube that includes a substantially cylindrical body portion having an interior defining a flow passage and having a tip extension extending therefrom and a tip portion extending along a pitot tube axis from the body portion is disclosed. The tip portion includes a high thermal conductive insert surrounding the tip extension and a tip cover covering the high thermal conductive insert.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIGS. 2A and 2B are cross-sectional views of an embodiment of a pitot tube; and

FIG. 3 is a cross-sectional view of another embodiment of a pitot tube.

Figure 1:
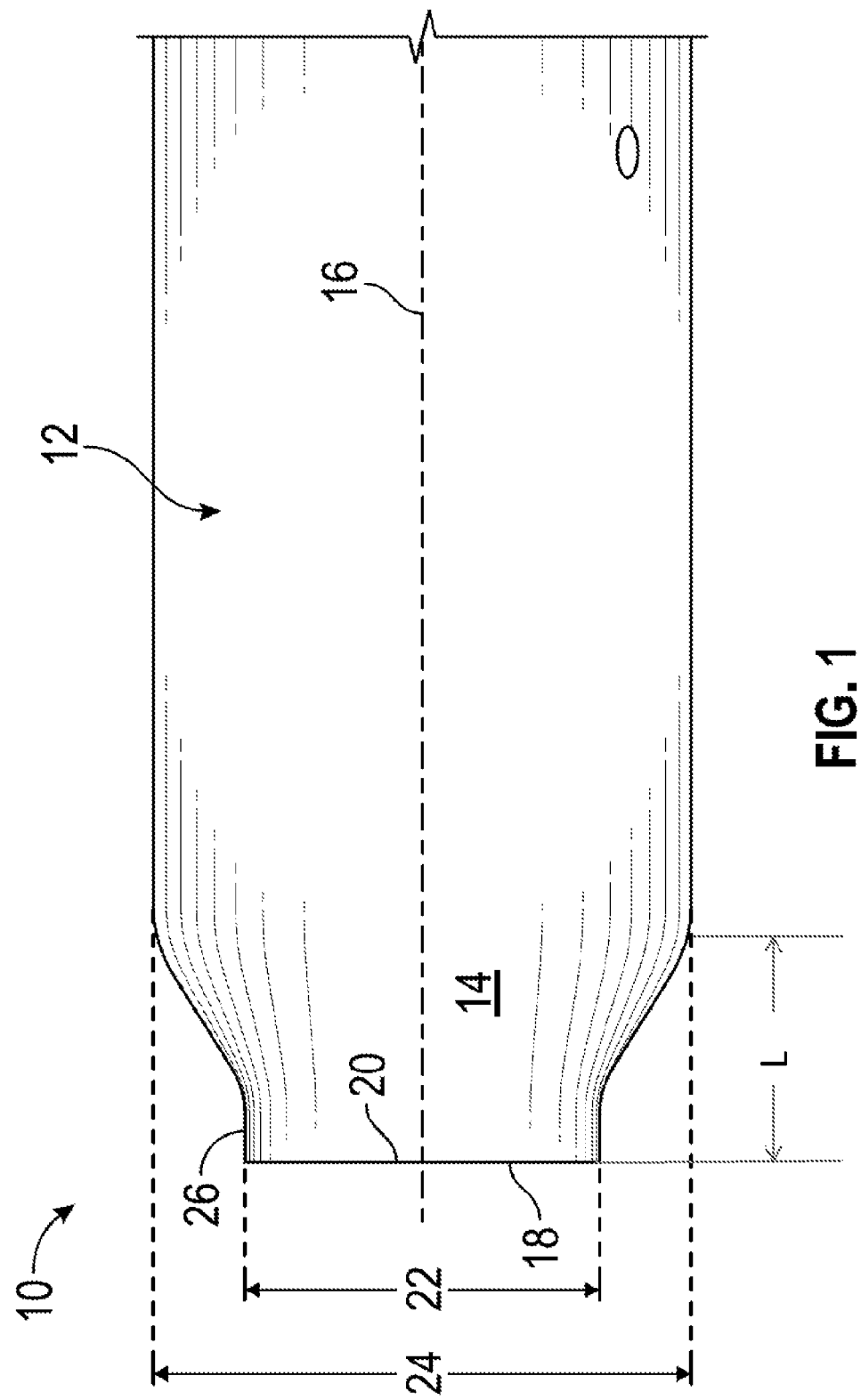
FIG. 1 is cross section of pitot tube according to one embodiment.

The detailed description explains embodiments of the disclosure, together with advantages and features, by way of example with reference to the drawings.

DETAILED DESCRIPTION

Shown in FIG. 1 is a view of an embodiment of a pitot tube 10. The pitot tube 10 includes a cylindrical body portion 12 and a tip portion 14 extending along a tube axis 16 from the body portion 12 toward a tube inlet 18. In the embodiment of FIG. 1, the tip portion 14 includes an inlet opening 20 having an inlet diameter 22 smaller than a body diameter 24 of the body portion 12. The tip portion 14, between the body portion 12 and the inlet opening 20, tapers in diameter along a concave curve 26. In some embodiments, the concave curve 26 does not extend entirely to the inlet opening 20 as the inlet diameter 22 extends axially from the inlet opening 20 to the concave curve 26. It shall be understood that the curve 26 may be straight or a profile that is aerodynamically suitable in one embodiment.

As shown, the tip portion 14 has a tip length L. The length of the tip may be limited by an ability of a heating element or coils disposed inside the tip to provide heat to it. That is, if the tip is too long, the heater may not be able to heat a distal end thereof such that ice does not form or otherwise accumulate in or on the tip 14.

It has been discovered that increasing the tip length L leads to pitot tube performance improvement. Such improvement may come in the form of better impact pressure (Qc).

FIG. 2A shows an exploded cross-sectional view of a pitot tube that may improve the impact pressure measurement by maintaining sufficient tip temperature to avoid freezing in icing conditions and FIG. 2B shows the tube assembled.

The pitot tube 200 includes a body 202. The body may be formed of any type of metal and, in one embodiment, is formed of nickel. The body 202 is a tube in one embodiment and includes an internal region 203 into which air flows. As will be understood, the inlet 204 to the internal region 203 can be varied depending on the circumstances. As illustrated, a heating element 210 is disposed within the internal region 203. The type and configuration of this heating element 210 may include coils or any other type of heating element. In one embodiment, the heating element includes one or more coil wraps disposed at an interior of the pitot tube, the one or more coil wraps establishing a variable watt density along the interior of the pitot tube.

The internal region 203 defines a flow passage as will be understood by those skilled in the pitot tube arts. The flow enters the body 202 through a tip 220.

The tip 220 includes three portions, a disk 250, a tip cover 254 and high thermal conductive insert 252 disposed between the disk 250 and the tip cover 254 and in thermal contact with both. The disk 250 and tip cover 254 may be formed of the same material as the body 202 in one embodiment. The insert 252 is formed of graphite or carbon graphite. Of course, any material having a higher thermal conductivity than the body/disk/tip cover may be used to form the insert 252.

In operation, the insert 252 allows for heat more easily be transmitted from the heating element 210 to the tip cover

254. This allows for the tip length L to be increased and, thus, for better measurements.

The tube 200 may be formed by inserting the insert 252 into the tip cover 254. The tip cover 254 is sized and configured to receive and mate with the insert. The assembly of the insert 252 and tip cover 254 may then be pressed against the disk 250. The tip cover 254 may be sized and arranged to include extensions 260 that can contact the disk 250 such that the tip cover 254 and the disk 250 may be friction welded together. As formed, the tip assembly (254, 252, 250) can then be friction welded to the tube 202. In operation, the disk 250 is in thermal contact with the heating element 210.

FIG. 3 illustrates a different manner to form a pitot tube including a high thermal conductive tip insert 252. In this embodiment, a tube may be provided. An extension 304 may then be machined from the tube and has a smaller outer diameter than the tube. An inner recess 306 to house a heating element may also be machined from the tube 302. The high thermal conductive tip insert 252 may then be disposed around the extension 304 and then, a metal tip cover may be deposited over the high thermal tip insert 252. The metal deposited may the same as that used for the tube 302 in one embodiment and further machined to obtain a suitable profile.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

The invention claimed is:

1. A pitot tube comprising:
   a substantially cylindrical body portion having an interior defining a flow passage; and
   a tip portion extending along a pitot tube axis from the body portion, the tip portion including:
   a disk;
   a tip cover; and
   a high thermal conductive insert disposed between the disk and the tip cover and in thermal contact with both.

2. The pitot tube of claim 1, wherein the high thermal conductive insert is formed of graphite or carbon graphite.

3. The pitot tube of claim 2, wherein the disk and tip cover are formed of nickel.

4. The pitot tube of claim 1, wherein the disk and tip cover are friction welded to each other.

5. The pitot tube of claim 4, wherein the disk is friction welded to the body portion.

6. The pitot tube of claim 1, further comprising:
   one or more electrical coils comprising one or more coil wraps disposed at an interior of the body portion.

7. A pitot tube comprising:
   a substantially cylindrical body portion having an interior defining a flow passage and having a tip extension extending therefrom; and
   a tip portion extending along a pitot tube axis from the body portion, the tip portion including:
   a high thermal conductive insert surrounding the tip extension; and
   a tip cover covering the high thermal conductive insert.

8. The pitot tube of claim 7, wherein the high thermal conductive insert is formed of graphite or carbon graphite.

9. The pitot tube of claim 7, wherein the body portion and the tip cover are formed of nickel.

10. The pitot tube of claim 7, further comprising:
    one or more electrical coils comprising one or more coil wraps disposed at an interior of the body portion.

\* \* \* \* \*